(12) United States Patent
Aritomi et al.

(10) Patent No.: US 8,162,623 B2
(45) Date of Patent: Apr. 24, 2012

(54) HIGH-PRESSURE LIQUID SUPPLY PUMP

(75) Inventors: Shunsuke Aritomi, Tokai (JP);
Noriyuki Maekawa, West Bloomfield, MI (US); Hideki Machimura, Tokai (JP); Masashi Nemoto, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 601 days.

(21) Appl. No.: 12/261,439

(22) Filed: Oct. 30, 2008

(65) Prior Publication Data

US 2009/0116976 A1 May 7, 2009

(30) Foreign Application Priority Data

Nov. 1, 2007 (JP) ................................. 2007-285460

(51) Int. Cl.
*F04B 49/00* (2006.01)
(52) U.S. Cl. ........................................ 417/311; 417/441
(58) Field of Classification Search .................. 417/307, 417/311, 440, 441
See application file for complete search history.

(56) References Cited

U.S. PATENT DOCUMENTS

| | | | |
|---|---|---|---|
| 5,295,469 A | 3/1994 | Kariya et al. | |
| 2002/0062817 A1 | 5/2002 | Endo | |
| 2005/0205065 A1 | 9/2005 | Rembold et al. | |
| 2008/0047621 A1 | 2/2008 | Ittlinger et al. | |

FOREIGN PATENT DOCUMENTS

| | | |
|---|---|---|
| DE | 10 2004 048 593 A1 | 2/2006 |
| EP | 1 411 238 A1 | 4/2004 |
| JP | 58-4778 U | 1/1983 |
| JP | 2003-343395 A | 12/2003 |

OTHER PUBLICATIONS

International Search Report dated Nov. 8, 2010 (eight (8) pages).

*Primary Examiner* — Vip Patel
(74) *Attorney, Agent, or Firm* — Crowell & Moring LLP (57) ABSTRACT

An object of the present invention is to reduce the pressure loss in a relief valve employed for a high-pressure liquid supply pump. Disclosed is a high-pressure liquid supply pump for pressurizing a liquid and supplying the pressurized liquid from a low-pressure side to a high-pressure side. The pump includes a relief path which releases the pressurized liquid from the high-pressure side to the low-pressure side, and a relief valve which is positioned in the relief path and equipped with an intermediate chamber, a valve seat positioned toward the high-pressure side of the intermediate chamber, a ball valve that is attachable to and detachable from the valve seat, and a ball valve retainer for pressing the ball valve against the valve seat. The relief path is configured so that an inflow path to the intermediate chamber and an outflow path from the intermediate chamber both produce a restriction effect. The ball valve retainer has a pressure reception surface for receiving the pressure from the intermediate chamber. A first pressure reception area, which detaches the ball valve from the valve seat upon receipt of liquid pressure of the pressurized liquid from a high-pressure section when the relief valve closes, is smaller than a second pressure reception area, which lifts the ball valve and the ball valve retainer upon receipt of liquid pressure from the intermediate chamber.

11 Claims, 10 Drawing Sheets

CROSS-SECTIONAL VIEW A-A

HIGH-PRESSURE LIQUID SUPPLY PUMP

BACKGROUND OF THE INVENTION

1. Field of the Invention

The present invention relates to a high-pressure liquid supply pump, and more particularly to a high-pressure fuel supply pump capable of avoiding an abnormally high fuel pressure.

2. Description of the Related Art

In a high-pressure fuel supply pump disclosed in JP-2003-343395-A, a relief valve (check valve) is incorporated as a safety valve with its outlet connected to a low-pressure piping. More specifically, an intake path and a delivery path of the fuel supply pump are positioned close to each other and interconnected with a communication path in which the relief valve is installed. This makes it possible to remove a relief piping from an engine while the fuel pump is of a small size.

The valve structure disclosed in JP-58-004778-U avoids chattering of a relief valve that is used as a safety valve. When the delivery pressure of a lubrication pump unduly rises, this relief valve is relieved to avoid damage, for instance, to a supply pipe connected to the lubrication pump and component parts of the lubrication pump. More specifically, a first operating valve and a second operating valve are used. These valves have a first pressure reception surface and a second pressure reception surface, which differ in pressure reception area. When pump pressure acting on the first pressure reception surface opens the first operating valve, a force considerably greater than the force applied to a valve seat acts on the second pressure reception surface and moves the valve to its terminal position. Therefore, the relief status can be indicated steadily and definitely by using an indicator that operates in coordination with a valve disc.

SUMMARY OF THE INVENTION

Problems with the above prior arts are described below.

In a large-capacity high-pressure fuel supply pump that pressurizes a large amount of fuel to a high pressure, the capacity of a relief valve serving as a safety valve becomes insufficient when an abnormally high pressure is generated in a common rail or other high-pressure piping due, for instance, to a failure of a high-pressure fuel supply pump, a fuel injection valve for supplying fuel to an engine, or an engine control unit (ECU) for controlling such devices. In other words, the pressure loss in the relief valve cannot be sufficiently reduced relative to the flow rate of fuel relieved. Therefore, the fuel pressure exceeds the acceptable value of the high-pressure piping.

The pressure tightness of high-pressure piping parts could be increased to solve the above problem. However, it would considerably increase the weight and cost. Further, the relief valve capacity could be increased by using a large-size relief valve or a plurality of relief valves. However, it would enlarge the relief valve size, the external size of the body, and the size of the high-pressure fuel supply pump. Enlarging the size of the high-pressure fuel supply pump results in failure to obtain a space for high-pressure fuel supply pump installation and increases the cost due to a complicated high-pressure piping layout.

Figure 4:
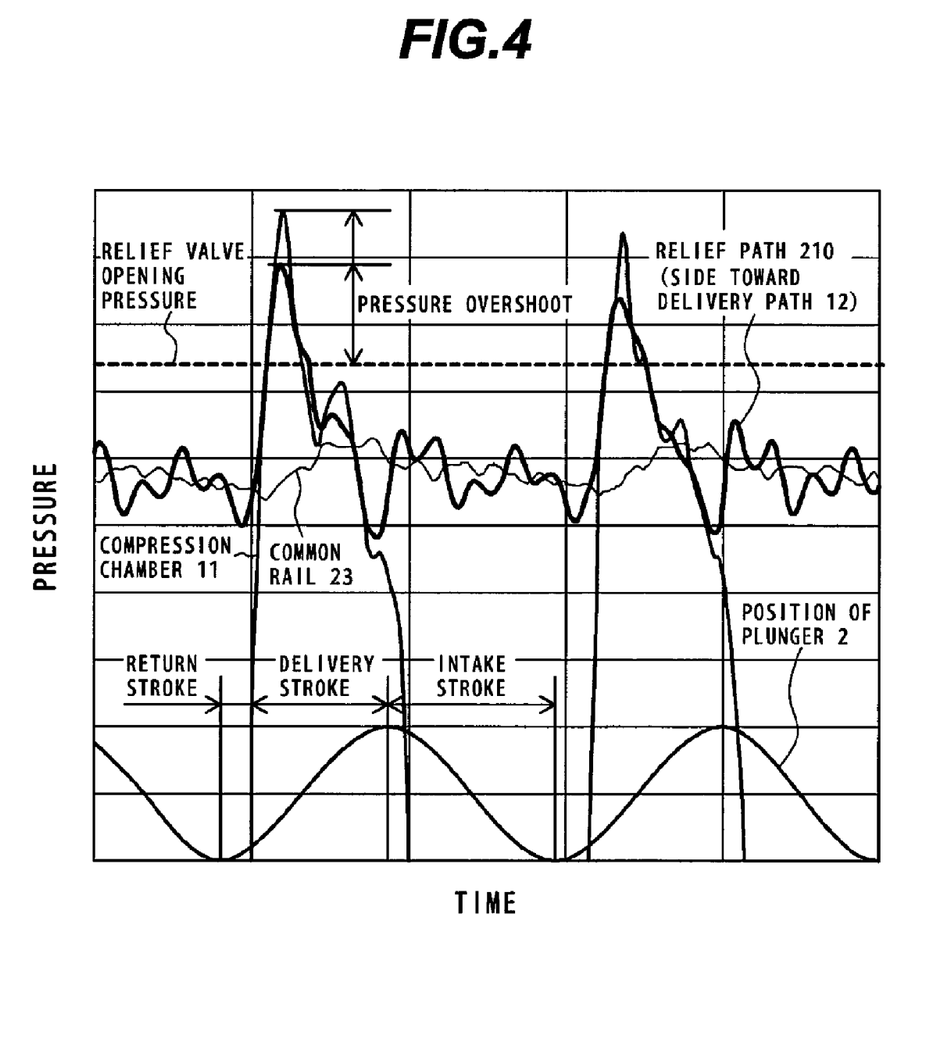
FIG. 4 shows pressure waveforms derived from a common rail and various components of a high-pressure fuel supply pump.

Further, the valve opening pressure at which the relief valve opens could be set to be low for the purpose of preventing the acceptable value of the high-pressure piping from being exceeded in the event of generation of an abnormally high pressure while considering in advance an increase in the pressure loss in the relief valve due to an increase in the relief flow rate. In such an instance, however, the overshoot pressure of a relief valve joint, which is shown in FIG. 4, exceeds the valve opening pressure during a normal operation to cause leakage and decrease the delivery flow rate.

In view of the above circumstances, a method of using a relatively high valve opening pressure setting to avoid a decrease in the delivery flow rate during a normal operation may be used to increase the lift amount of the relief valve and decrease the pressure loss during valve seat passage without increasing the size and cost of the high-pressure fuel supply pump. A prior art for implementing the above method is disclosed in JP-58-004778-U. However, the restriction for maintaining the pressure for lift amount increase can cause the pressure loss. More specifically, the prior art disclosed in JP-58-004778-U does not cover a situation where the operation is conducted at a high pressure and at a high flow rate. Therefore, the fuel path does not have a sufficiently large cross-sectional area.

An object of the present invention is to be provide a high-pressure fuel supply pump having a valve disc structure that relieves or solves the aforementioned problems by minimizing the pressure difference between the inlet and outlet of a valve at the time of pressure relief even when it is applied to an operation conducted at a high pressure and a high flow rate that are not covered by the above-mentioned prior art.

In accomplishing the above object, according to a first aspect of the present invention, there is provided a high-pressure liquid supply pump for pressurizing a liquid and supplying the pressurized liquid from a low-pressure side to a high-pressure side, the pump including: a relief path which releases the pressurized liquid from the high-pressure side to the low-pressure side; and a relief valve assembly which is positioned in the relief path and equipped with an intermediate chamber, a valve seat positioned toward the high-pressure side of the intermediate chamber, a valve element that is attachable to and detachable from the valve seat, and a valve element retainer for pressing the valve element against the valve seat; wherein the relief path is configured so that an inflow path to the intermediate chamber and an outflow path from the intermediate chamber both produce a restriction effect; and wherein the valve element retainer has a pressure reception surface for receiving the pressure from the intermediate chamber.

According to a second aspect of the present invention, there is provided the high-pressure liquid supply pump as described in the first aspect, wherein a first pressure reception area, which detaches the valve element from the valve seat upon receipt of liquid pressure of the pressurized liquid from a high-pressure section when the relief valve assembly closes, is smaller than a second pressure reception area, which lifts the valve element and the valve element retainer upon receipt of liquid pressure from the intermediate chamber.

According to a third aspect of the present invention, there is provided the high-pressure liquid supply pump as described in the first aspect, wherein the relief valve assembly includes an adjuster for adjusting the maximum lift amount of the valve element.

According to a fourth aspect of the present invention, there is provided the high-pressure liquid supply pump as described in the third aspect, wherein the relief valve assembly has a spring between the adjuster and the valve element retainer; and wherein the adjuster adjusts the force of pressing the valve element against the valve seat.

According to a fifth aspect of the present invention, there is provided the high-pressure liquid supply pump as described in the first aspect, wherein, when the lift amount of the valve element is maximized, an outflow path from the intermediate chamber has a larger cross-sectional area than an inflow path to the intermediate chamber.

According to a sixth aspect of the present invention, there is provided the high-pressure liquid supply pump as described in the first aspect, wherein the outflow path from the intermediate chamber has a smaller cross-sectional area than the inflow path to the intermediate chamber.

According to a seventh aspect of the present invention, there is provided the high-pressure liquid supply pump as described in the first aspect, wherein the liquid pressure of the intermediate chamber is lower than the liquid pressure on the high-pressure side and higher than the liquid pressure on the low-pressure side.

According to an eighth aspect of the present invention, there is provided the high-pressure liquid supply pump as described in the first aspect, wherein a lateral surface of the valve element retainer is slidably supported and provided with the outflow path from the intermediate chamber.

According to a ninth aspect of the present invention, there is provided the high-pressure liquid supply pump as described in the first aspect, wherein the outflow path from the intermediate chamber is a hole formed in the valve element retainer.

According to a tenth aspect of the present invention, there is provided the high-pressure liquid supply pump as described in the first aspect, wherein the outflow path from the intermediate chamber is a hole made in a wall surface forming the intermediate chamber.

According to an eleventh aspect of the present invention, there is provided the high-pressure liquid supply pump as described in the first aspect, wherein the valve element and the valve element retainer are integrated into a single part.

According to a twelfth aspect of the present invention, there is provided the high-pressure liquid supply pump as described in the first aspect, wherein the liquid is a fuel.

The present invention, which is configured as described above, offers the following advantages.

When a relief mechanism included in the high-pressure liquid supply pump operates to relieve a high-pressure liquid in a situation where an abnormally high pressure is generated in a high-pressure piping, the relief amount of a valve can be increased. Since this considerably reduces the pressure loss between the valve element and the valve seat, the relief amount can be increased.

Further, since the pressure loss is reduced, the valve opening pressure at which the relief valve assembly opens can be set to be higher than when a conventional product is used. Therefore, a decrease in the delivery flow rate can be prevented by avoiding accidental leakage that occurs when the overshoot pressure exceeds the valve opening pressure during a normal operation.

For example, the use of a large-size relief valve assembly or a plurality of relief valve assemblies due to an increase in the pressure and flow rate, a complicated layout of high-pressure piping, and the resulting cost increase can be avoided or suppressed.

The maximum lift amount of the valve element can be adjusted to avoid an excessive increase in pressure reception surface displacement and permit the valve element to successfully returns to a predetermined position, thereby allowing the relief mechanism to function steadily.

The force of pressing the valve element can be adjusted to adjust the valve opening pressure.

DETAILED DESCRIPTION OF THE PREFERRED EMBODIMENTS

Embodiments of the present invention will now be described with reference to the accompanying drawings.

Figure 1:
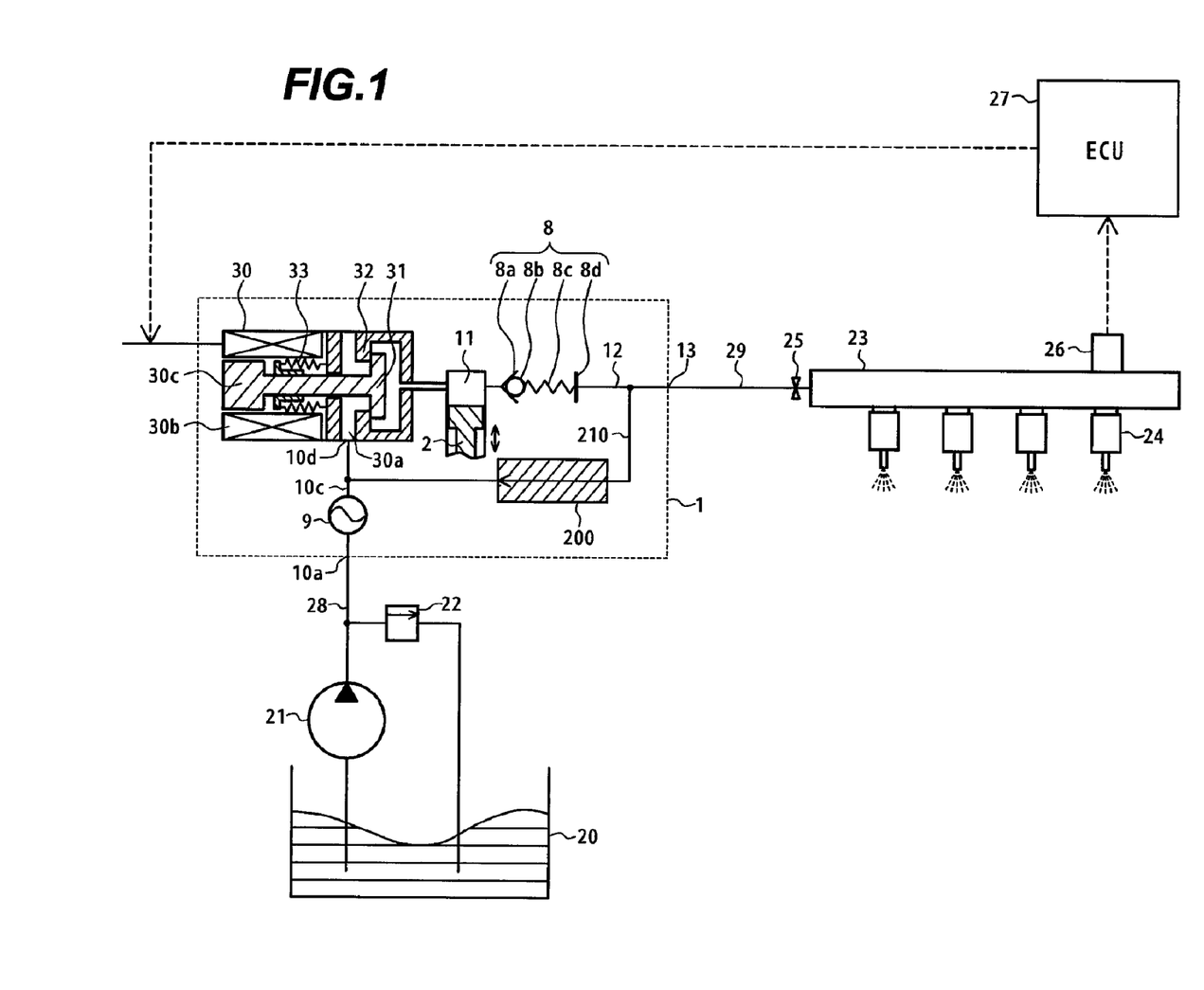
FIG. 1 shows the overall configuration of a system according to the present invention.

FIG. 1 shows the overall configuration of a system according to the present invention. A portion enclosed by a broken line in FIG. 1 is a pump housing 1 for a high-pressure fuel supply pump. A mechanism and parts enclosed by the broken line are contained in the pump housing 1.

Fuel in a fuel tank 20 is drawn by a feed pump 21 and forwarded to a fuel inlet 10a in the pump housing 1 through an intake piping 28. The fuel passing through the fuel inlet 10a is supplied to an intake port 30a in an electromagnetic intake valve mechanism 30, which forms a capacity change mechanism, through a pressure pulsation reduction mechanism 9 and an intake path 10c.

The electromagnetic intake valve mechanism 30 includes an electromagnetic coil 30b. When the electromagnetic coil 30b is energized, an electromagnetic plunger 30c compresses a spring 33 to move rightward as viewed in FIG. 1, and remains in the resulting state. In this instance, an intake valve disc 31, which is mounted on the leading end of the electromagnetic plunger 30c, opens an inlet 32 that communicates with a compression chamber 11 of the high-pressure fuel supply pump. If there is no fluid pressure differential between the intake path 10c (intake port 30a) and the compression chamber 11 while the electromagnetic coil 30b is de-energized, the force of the spring 33 presses the intake valve disc 31 in the valve closing direction (leftward as viewed in FIG. 1) to close the inlet 32 and keep it closed.

During an intake stroke, which begins when a later-described cam of an internal combustion engine rotates to displace a plunger 2 downward as viewed in FIG. 1, the cubic capacity of the compression chamber 11 increases to decrease the fuel pressure in the compression chamber 11. When the fuel pressure in the compression chamber 11 drops below the pressure in the intake path 10c (intake port 30a) during the intake stroke, the valve opening force (the force of displacing the intake valve disc 31 to the right as viewed in FIG. 1) is exerted on the intake valve disc 31 due to the fluid pressure differential of fuel. This valve opening force causes the intake valve disc 31 to open irrespective of the force of the spring 33, thereby opening the inlet 32. When, in the resultant state, a control signal from an ECU 27 is applied to the electromagnetic intake valve mechanism 30, a current flows to the electromagnetic coil 30b of the electromagnetic intake valve mechanism 30. The resulting electromagnetic force then causes the electromagnetic plunger 30c to further compress the spring 33, move rightward as viewed in FIG. 1, and keep the inlet 32 open.

When the plunger 2 switches from the intake stroke to the compression stroke (the stroke for an ascent from the bottom dead center to the top dead center) with an input voltage applied to the electromagnetic intake valve mechanism 30, the electromagnetic coil 30b remains energized. Therefore, the magnetic force is maintained so that the intake valve disc 31 remains open. The cubic capacity of the compression chamber 11 decreases due to the compression motion of the plunger 2. In this state, however, the fuel taken into the compression chamber 11 passes again between the intake valve disc 31, which is in the valve-open state, and the inlet 32, and returns to the intake path 10c (intake port 30a). Consequently, the pressure in the compression chamber 11 does not rise. This stroke is called a return stroke.

When the electromagnetic coil 30b is de-energized during the return stroke, the magnetic force acting on the electromagnetic plunger 30c disappears in a predetermined period of time (with a magnetic/mechanical time delay). The force of the spring 33, which is constantly acting on the intake valve disc 31, then moves the intake valve disc 31 leftward as viewed in FIG. 1 to close the inlet 32. When the inlet 32 closes, the fuel pressure in the compression chamber 11 begins to increase in coordination with an ascent of the plunger 2. When the fuel pressure in the compression chamber 11 exceeds a pressure that is higher than the fuel pressure at an outlet 13 by a predetermined value, the fuel remaining in the compression chamber 11 is subjected to high-pressure delivery and supplied to a common rail 23 through a delivery valve mechanism 8. This stroke is called a delivery stroke. As described above, the compression stroke for the plunger 2 is composed of the return stroke and delivery stroke.

During the return stroke, the fuel returned to the intake path 10c invokes pressure pulsation in the intake path. This pressure pulsation slightly moves backward from the fuel inlet 10a to the intake piping 28. The greater part of the returned fuel is absorbed by the pressure pulsation reduction mechanism 9.

The amount of pressurized fuel to be delivered can be controlled by controlling the timing for de-energizing the electromagnetic coil 30b of the electromagnetic intake valve mechanism 30. Advancing the timing for de-energizing the electromagnetic coil 30b decreases the ratio of the return stroke to the compression stroke and increases the ratio of the delivery stroke to the compression stroke. In other words, this decreases the amount of fuel to be returned to the intake path 10c (intake port 30a) and increases the amount of fuel to be subjected to high-pressure delivery. On the other hand, retarding the timing for the above-mentioned de-energization increases the ratio of the return stroke to the compression stroke and decreases the ratio of the delivery stroke to the compression stroke. In other words, this increases the amount of fuel to be returned to the intake path 10c and decreases the amount of fuel to be subjected to high-pressure delivery. The above de-energization timing is controlled in accordance with a command from the ECU.

The amount of fuel to be subjected to high-pressure delivery can be equalized with the amount of fuel required for the internal combustion engine by allowing the ECU to control the electromagnetic coil de-energization timing as described above.

In the pump housing 1, the delivery valve mechanism 8 is positioned between the outlet (delivery side piping joint) 13 and the outlet side of the compression chamber 11. The delivery valve mechanism 8 includes a seat member 8a, a delivery valve 8b, a delivery valve spring 8c, and a retention member (delivery valve stopper) 8d. While there is no fuel pressure differential between the compression chamber 11 and the outlet 13, the delivery valve 8b is closed as it is pressed against the seat member 8a by the force of the delivery valve spring 8c. When the fuel pressure in the compression chamber 11 exceeds a pressure that is higher than the fuel pressure at the outlet 13 by a predetermined value, the delivery valve 8b opens irrespective of the force of the delivery valve spring 8c, thereby allowing the fuel in the compression chamber 11 to be delivered to the common rail 23 through the outlet 13.

When the delivery valve 8b comes into contact with the retention member 8d after being opened, its operation is limited. Therefore, the stroke of the delivery valve 8b is properly determined by the retention member 8d. If the stroke is excessive, the delivery valve 8b closes with a delay so that the fuel to be delivered to the fuel outlet 13 flows back to the compression chamber 11. This results in a decrease in high-pressure pump efficiency. Further, when the delivery valve 8b repeatedly opens and closes, the retention member 8d serves as a guide in order that the delivery valve moves only in the stroke direction. As the delivery valve mechanism 8 is configured as described above, it functions as a check valve that limits the direction of fuel distribution.

After the fuel is introduced into the fuel inlet 10a as described above, the plunger 2 reciprocates in the compression chamber 11 of the pump housing 1 to pressurize a necessary amount of the fuel to a high pressure. The pressurized fuel is then force-fed from the outlet 13 to the common rail 23, which is a high-pressure piping, through the delivery valve mechanism 8.

Injectors 24 and a pressure sensor 26 are mounted on the common rail 23. An appropriate number of injectors 24 are installed in accordance with the number of cylinders in the internal combustion engine. Each injector opens and closes its valve in accordance with a control signal from the ECU 27 to inject the fuel into a cylinder.

A fuel relief operation according to a first embodiment of the present invention that is performed when an abnormally high pressure is generated in a high-pressure section of the common rail 23 or the like due, for instance, to a failure of an injector 24 will now be described.

The pump housing 1 includes a relief path 210, which provides communication between a delivery path 12 and intake path 10c. The relief path 210 includes a relief valve mechanism 200, which controls fuel flow such that it flows unidirectionally from the delivery path 12 to the intake path 10c.

First Embodiment

Figure 2A:
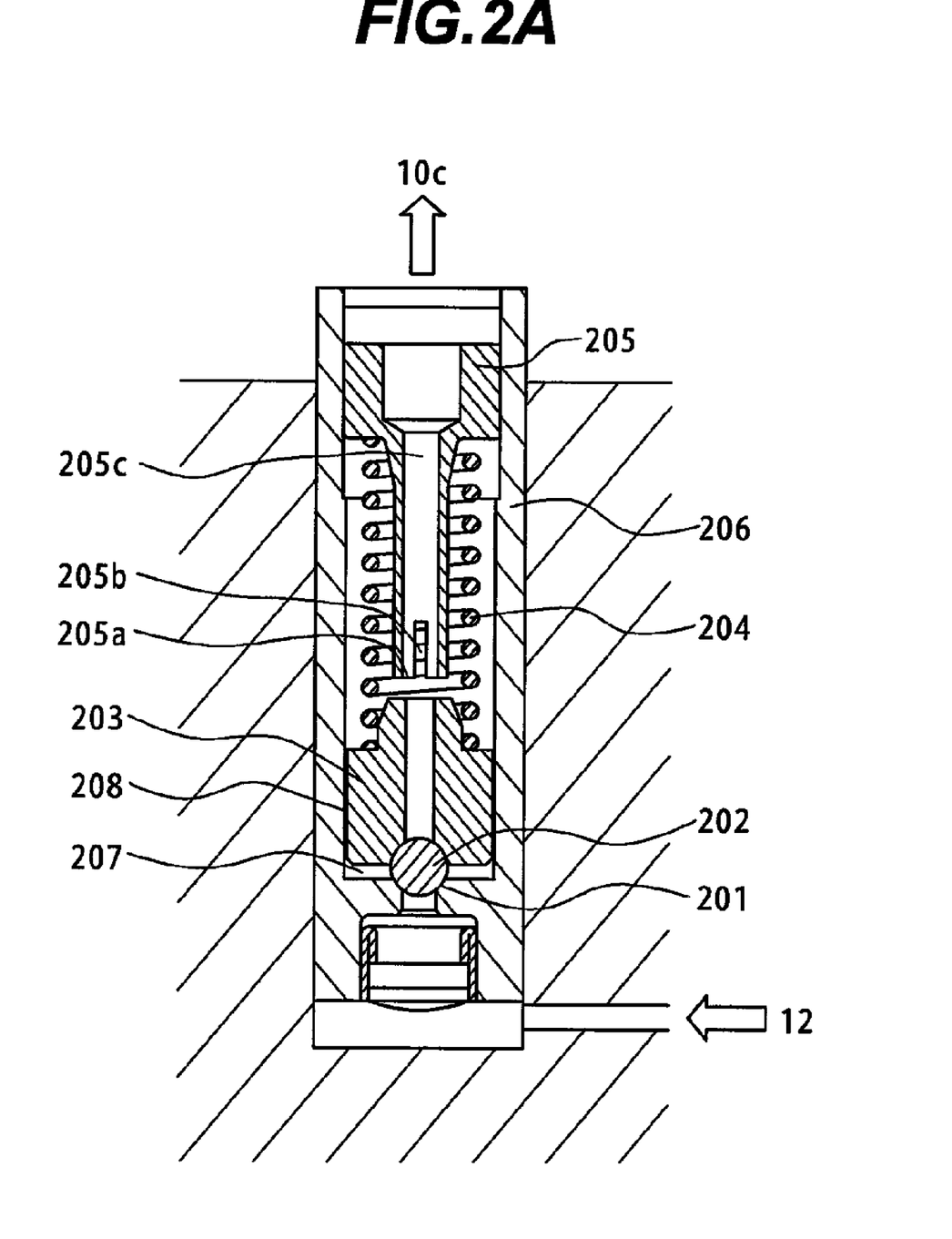
FIG. 2A is a structural cross-sectional view illustrating a relief valve mechanism according to a first embodiment of the present invention that is obtained when its valve is closed.

FIG. 2A is a structural cross-sectional view illustrating a relief valve mechanism according to the first embodiment of the present invention that is obtained when its valve is closed. The relief valve mechanism 200 includes a relief valve housing 206, which is integral with a relief valve seat 201; a ball valve 202 (in the Claims "a valve element"); a ball valve retainer 203 (in the Claims "a valve element retainer"), which presses the ball valve and forms a pressure reception surface; a relief spring 204; and a relief spring adjuster 205. The relief spring 204 presses the ball valve 202 against the relief valve seat 201 irrespective of a high pressure applied from the delivery path 12.

When the fluid force acting on the ball valve exceeds the force of the spring due to an abnormally high pressure in the delivery path, the ball valve 202 leaves the seat 201 to place the relief path in a communicating state. This makes it possible to perform setup by adjusting the press-fitting position of the relief spring adjuster 205, adjust the force of the relief spring, and arbitrarily set the valve opening pressure for the relief valve mechanism 200.

When the ball valve 202 leaves the relief valve seat 201, the fuel on the high-pressure side flows in through the resulting gap, thereby raising the pressure in an intermediate chamber 207. A lateral surface of the ball valve retainer 203 is supported by the inner surface of the relief valve housing 206 and allowed to slide through a tubular gap 208. After flowing into the intermediate chamber 207, the fuel passes through the tubular gap 208 and is directed downstream of the ball valve retainer 203. However, the tubular gap 208, which is a fuel outflow path from the intermediate chamber 207, produces a restriction effect. Therefore, the pressure in the intermediate chamber 207 is maintained lower than the pressure in the delivery path 12 and higher than the pressure prevailing downstream of the ball valve retainer 203.

The pressure differential between the intermediate chamber 207 and the downstream side of the ball valve retainer 203 applies a fluid force to the ball valve retainer 203 in the valve opening direction, thereby increasing the lift amounts of the ball valve and ball valve retainer. The fuel directed downstream of the ball valve retainer 203 passes through the spaces between the coils of the spring 204, runs through a back-pressure path 205c provided for the relief spring adjuster 205, and is introduced into the intake path 10c.

Figure 2B:
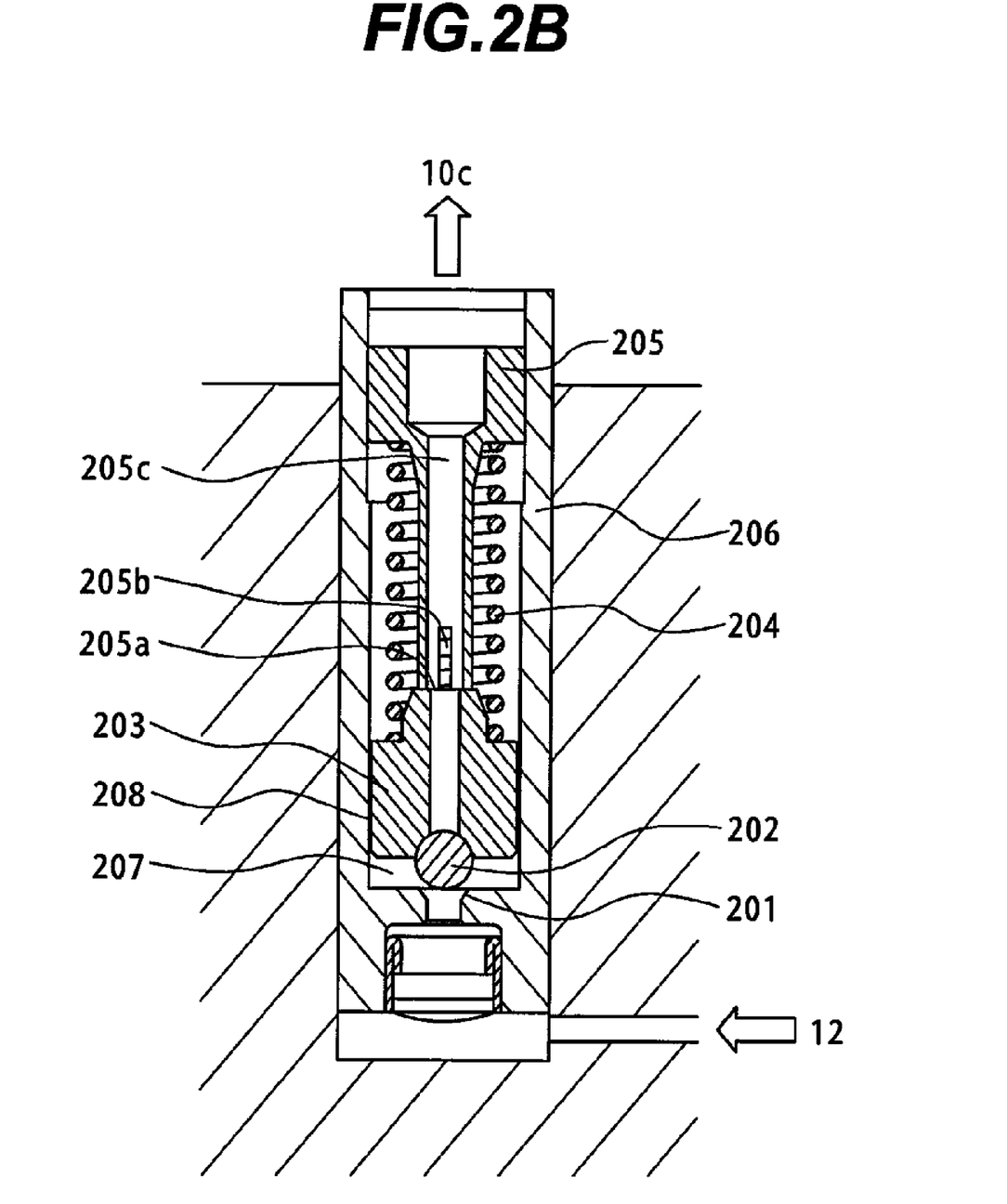
FIG. 2B is a structural cross-sectional view illustrating the relief valve mechanism according to the first embodiment of the present invention that is obtained when its valve is open due to the maximum lift.

FIG. 2B is a structural cross-sectional view illustrating the relief valve mechanism 200 according to the first embodiment that is obtained when its valve is open due to the maximum lift. To prevent the fuel path from being blocked when the spaces between the coils of the spring are eliminated due to spring compression, a stopper 205a, which is mounted on the relief spring adjuster 205, restricts the lift amount of the ball valve retainer in the state shown in the figure. In a maximum lift state in which the ball valve retainer 203 comes into close contact with the stopper 205a, the fuel passes through a slit 205b in the stopper 205a and is directed to the back-pressure path 205c.

Figure 2C:
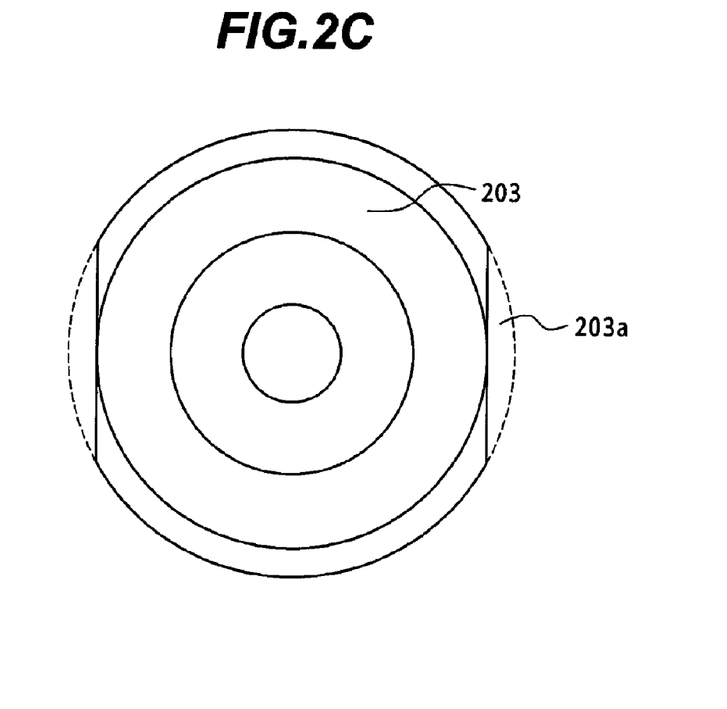
FIG. 2C shows the shape of a path that is formed in a ball valve retainer according to the first embodiment of the present invention.
Figure 2D:
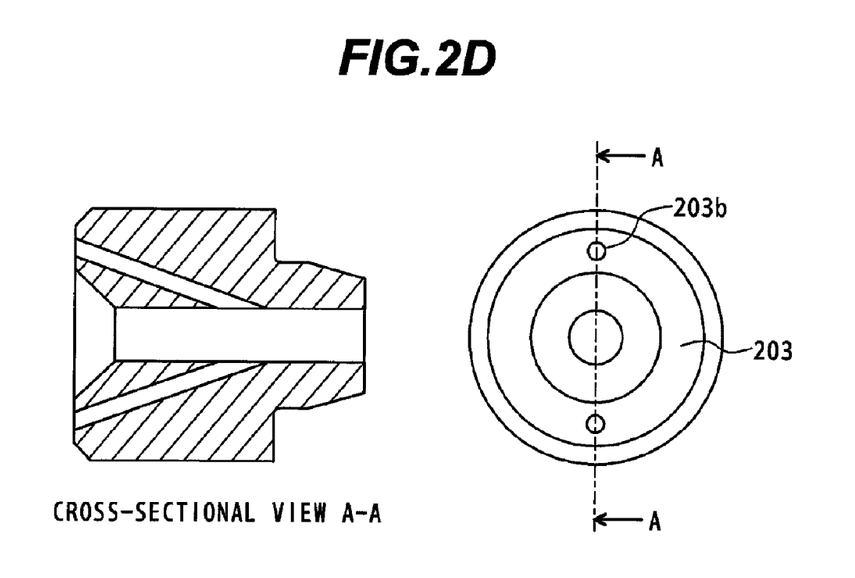
FIG. 2D shows the shape of a hole that is formed in the ball valve retainer according to the first embodiment of the present invention.

In the high-pressure pump, which pressurizes a fuel whose flow rate is high, the flow rate of a relieved fuel for use in the event of a failure is also high. In such an instance, adequate relief may not be provided by the tubular gap 208 alone. This issue is addressed by enlarging the cross-sectional area of the fuel outflow path from the intermediate chamber 207, more specifically, by forming a flat portion 203a on the lateral surface of the ball valve retainer 203 as shown in FIG. 2C or by making a hole 203b in the ball valve retainer 203 as shown in FIG. 2D.

Figure 3A:
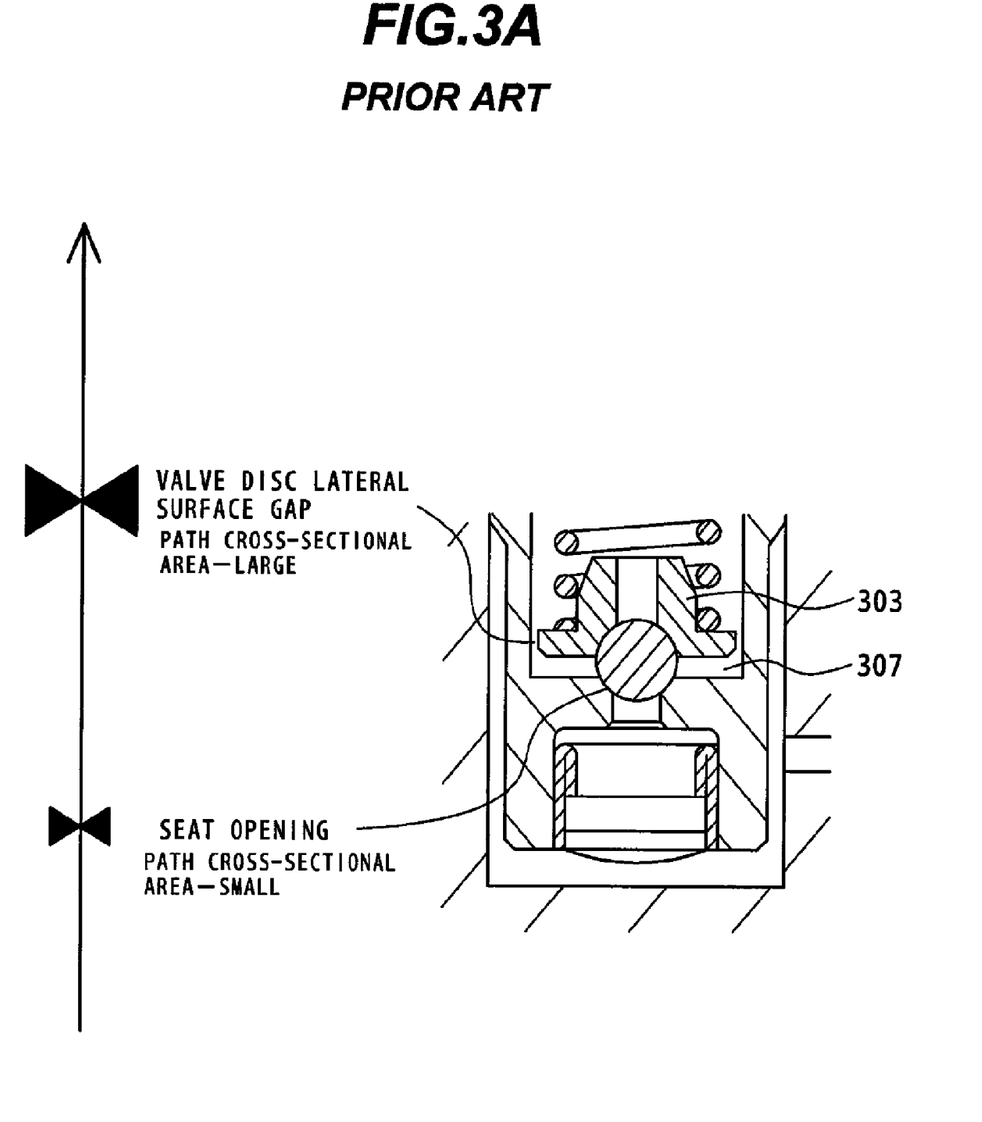
FIG. 3A includes an enlarged cross-sectional view of the seat section of a conventional relief valve and a schematic diagram illustrating a fluid path in the form of an orifice.
Figure 3B:
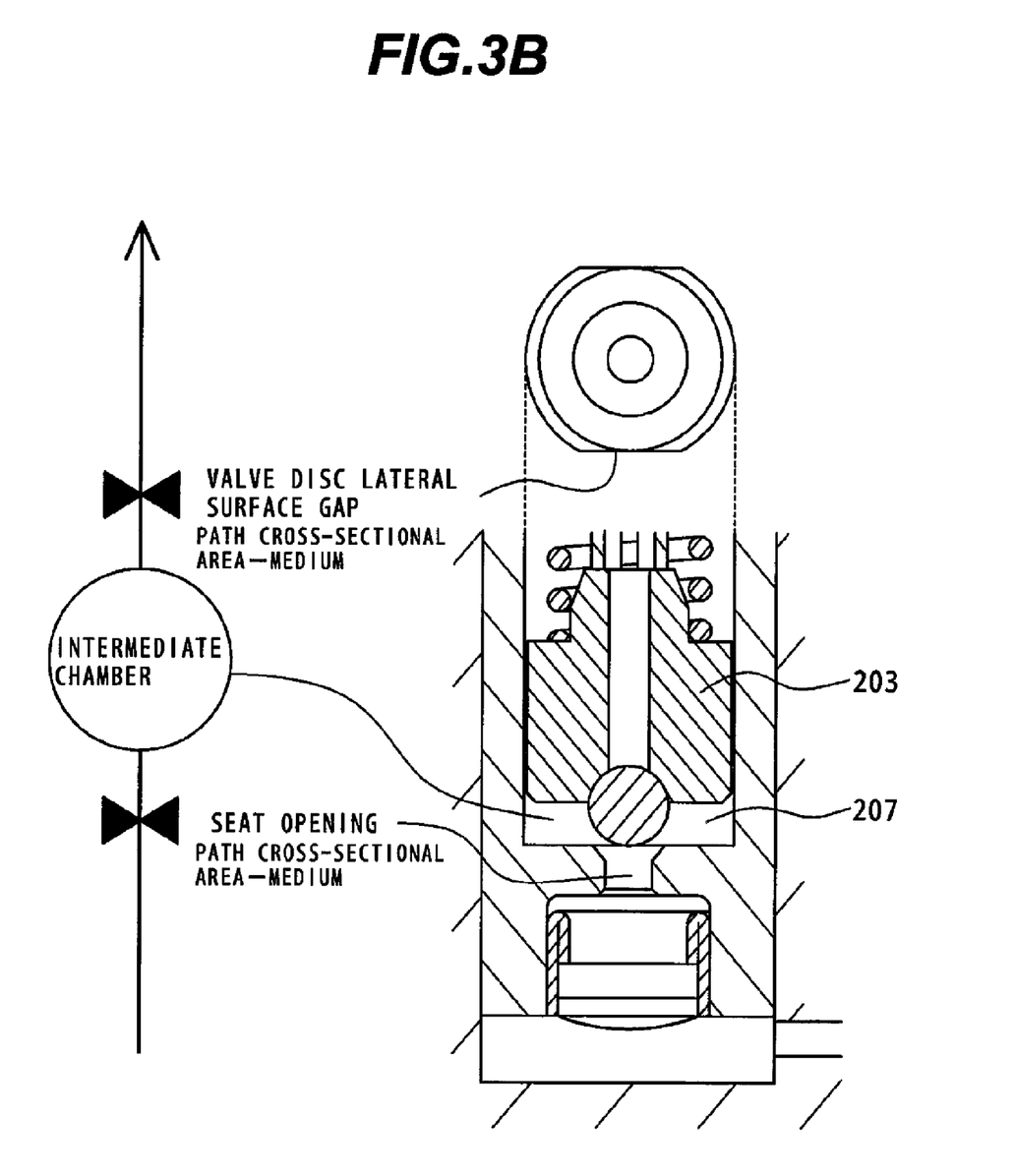
FIG. 3B includes an enlarged cross-sectional view of the seat section of the relief valve mechanism according to the first embodiment of the present invention and a schematic diagram illustrating a fluid path in the form of an orifice.

FIG. 3A includes an enlarged cross-sectional view of the seat section of a conventional relief valve. The schematic diagram positioned to the left of the enlarged cross-sectional view shows a seat opening and a ball valve lateral gap that are replaced by orifices. FIG. 3B includes an enlarged cross-sectional view of the seat section of the relief valve according to the first embodiment. The schematic diagram positioned to the left of the enlarged cross-sectional view shows a seat opening and a ball valve lateral gap that are replaced by orifices.

The conventional relief valve shown in FIG. 3A provides a very small lift amount even when it is open. Therefore, its seat section has a very small opening area. However, the path in the lateral surface of the ball valve retainer has a relatively large cross-sectional area. Schematically, a combination of a small-diameter orifice and a large-diameter orifice, which are series-connected, is used. This is seriously detrimental to pressure loss reduction that is provided by the seat section, which corresponds to the small-diameter orifice. On the other hand, the relief valve according to the first embodiment of the present invention, which is shown in FIG. 3B, provides a large lift amount when it is open and its seat section has a larger opening area than the counterpart of the conventional relief valve. Therefore, the pressure loss in the opening of the seat section is smaller than when the conventional relief valve is used.

The lateral surface gap of the ball valve produces a restriction effect. However, it is merely expected that the restriction effect is adequate enough to enable the intermediate chamber 207 to maintain the pressure necessary for providing a lift irrespective of the force of the spring 204. The magnitude of the restriction effect is mainly determined by the spring specifications and pressure reception surface cross-sectional area. However, the first embodiment can provide a sufficient lift amount without requiring the entire magnitude of the restriction effect of the conventional relief valve seat opening. Schematically, two series-connected, intermediate-diameter orifices having a larger cross-sectional area than the conventional relief valve seat opening are positioned before and after the intermediate chamber. The use of this configuration solves the aforementioned bottleneck issue of the conventional relief valve.

Figure 3C:
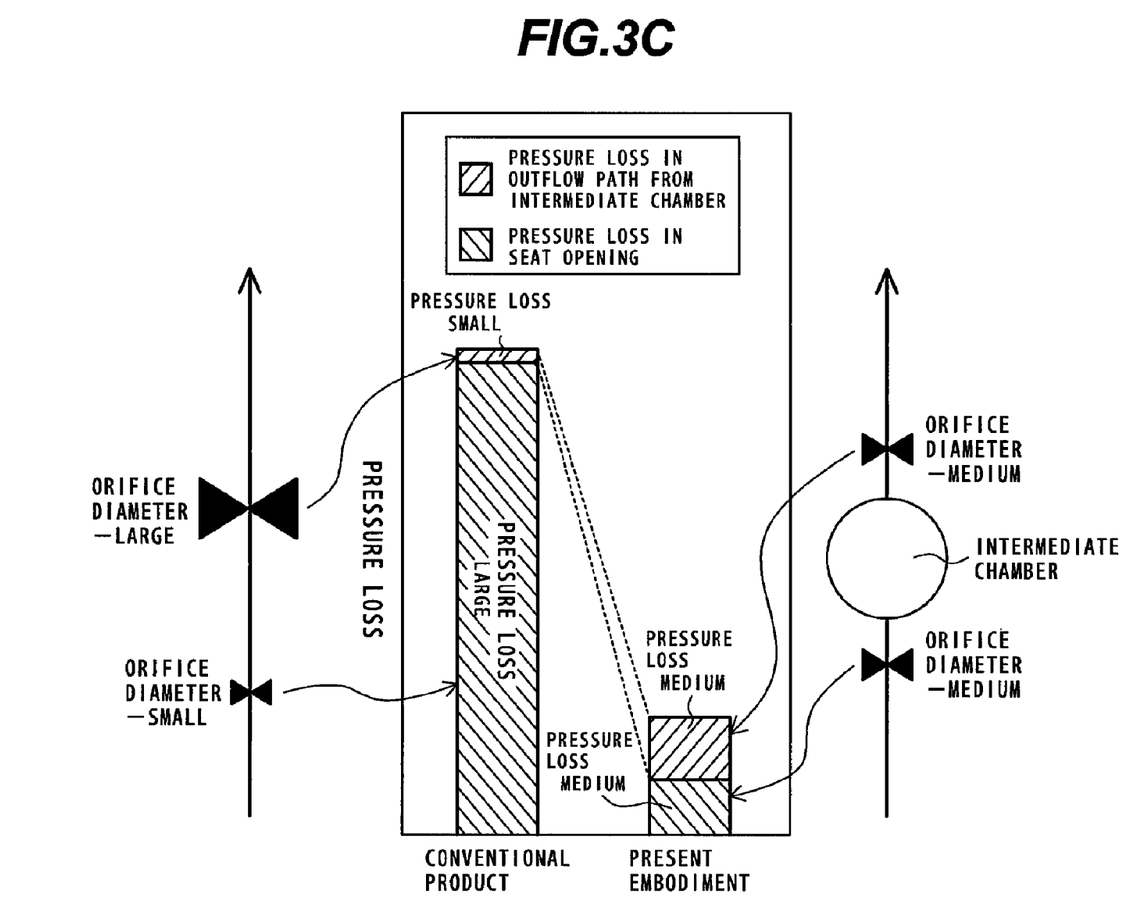
FIG. 3C shows a pressure loss comparison between a conventional relief valve and the relief valve mechanism according to the first embodiment of the present invention.

FIG. 3C relates to the conventional relief valve and the relief valve according to the present embodiment (first embodiment), and illustrates the pressure loss in the seat opening and the pressure loss in the lateral surface path of the ball valve retainer (the pressure loss in the outflow path from the intermediate chamber).

When the relief flow rate becomes high because of an abnormally high pressure that is generated due, for instance, to a failure in the fuel injection valve, the first embodiment can avoid an increase in the pressure loss in the relief valve or significantly reduce the pressure loss as compared to the conventional product. Therefore, even if the permissible piping pressure remains unchanged, the first embodiment makes it possible to use a higher valve opening pressure setting than when the conventional product is used.

The pressure behavior prevailing when the high-pressure fuel supply pump force-feeds the fuel to the common rail 23 in a normal manner under high pressure will now be described.

FIG. 4 shows pressure waveforms derived from the common rail and various components of the high-pressure fuel supply pump. During an ascent of the plunger, that is, during the compression stroke, a pressure overshoot (see FIG. 4) occurs in the compression chamber 11 for a brief period of time subsequent to a transition from the return stroke to the pressurization stroke. The pressure overshoot in the compression chamber 11 then propagates from the delivery path 12 to the relief path 210. However, if the relief valve opens in response to the overshoot pressure during a normal operation, leakage occurs to decrease the delivery rate. To avoid such a malfunction and maintain high pump efficiency, it is necessary to use a relief valve opening pressure setting that is sufficiently higher than the overshoot pressure.

If the axial length of the ball valve retainer 203 is increased to form the tubular gap 208, the mass of the ball valve increases to bring about generally unfavorable results. In the first embodiment, however, such a mass increase slows down the motion of the ball valve. Therefore, it can be expected that an erroneous response to the pressure overshoot will be avoided. Further, it can also be expected that the cubic capacity of the intermediate chamber 207 will absorb the pressure overshoot. In addition, the decrease in the pressure loss in the relief valve will reduce the pump driving force. The reduction of the pump driving force is favorable from the viewpoint of energy saving.

In the first embodiment, delivery begins when the pressure in the compression chamber 11 exceeds a predetermined pressure that is higher than the pressure in the delivery path 12. This reduces the pressure loss in the relief valve, decreases the maximum pressure in the delivery path 12 during a relief, reduces the pressure increase necessary for pumping, and decreases the pump driving force.

As described above, the first embodiment selects a relief valve opening pressure setting sufficiently higher than the overshoot pressure to reduce an increase in the pressure loss in the relief valve while avoiding a loss in the delivery flow rate during a normal operation. Therefore, even when an abnormally high pressure is generated in a large-capacity high-pressure fuel supply pump, it is possible to provide adequate relief immediately, thereby preventing the fuel pressure in the high-pressure piping from exceeding a prescribed value.

Second Embodiment

Figure 5:
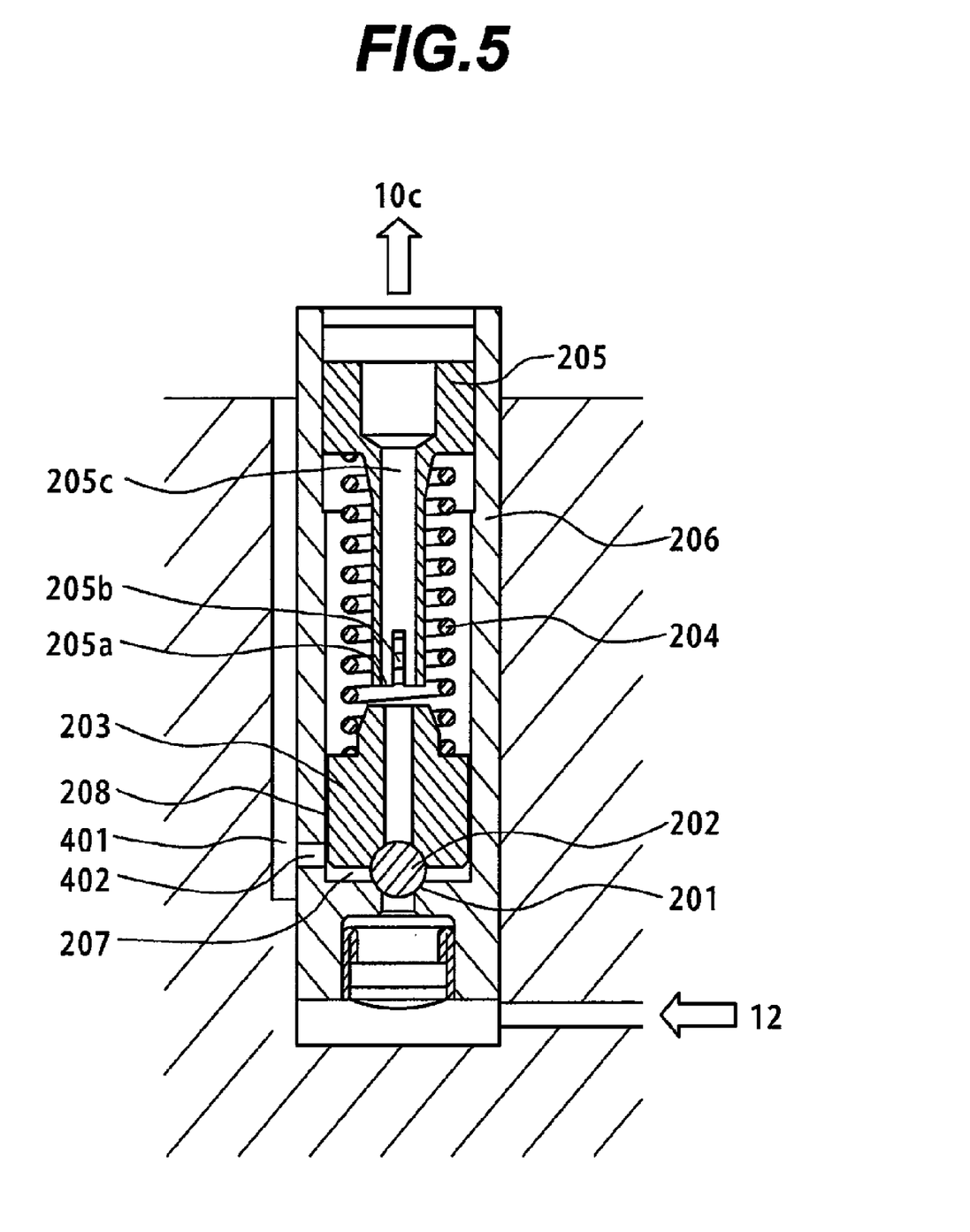
FIG. 5 is a cross-sectional view illustrating a relief valve (closed) according to a second embodiment of the present invention.

FIG. 5 is a cross-sectional view illustrating the relief valve (closed) according to a second embodiment of the present invention.

In the first embodiment, the entire fuel to be relieved passes through the lateral surface tubular gap of the ball valve retainer, then passes through the slit 205b and the spaces between the coils of the spring 204, and is directed to the intake path 10c. Therefore, an extra pressure loss may occur to increase the pressure loss in the event of a large-flow-rate relief. This problem is solved by the second embodiment. The second embodiment provides a hole 402 in the relief valve housing 206, which forms a wall surface of the intermediate chamber 207, and uses the hole 402 as a fuel outflow path from the intermediate chamber. After passing through the hole 402, the relieved fuel passes through a slit 401 in the pump body and is directed to the intake path 10c.

According to the second embodiment, which is configured as described above, fuel is mainly relieved from the hole 402. Therefore, the relieved fuel does not pass through a narrow gap, but is directly forwarded from the intermediate chamber toward the low-pressure side. This further reduces the pressure loss after passage through the outflow path from the intermediate chamber. Consequently, the relief valve according to the second embodiment is suitable for use in larger-capacity applications.

Third Embodiment

Figure 6:
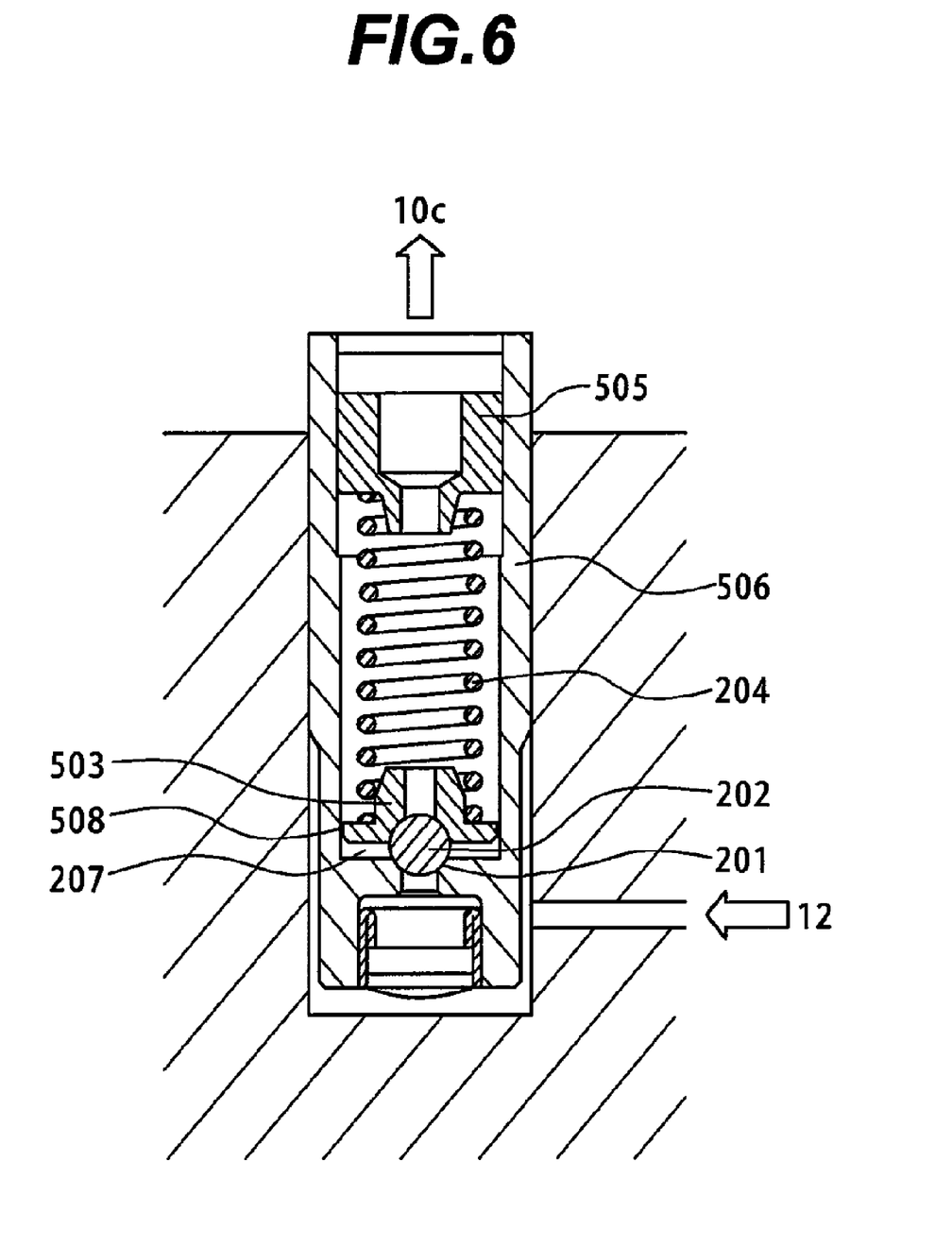
FIG. 6 is a cross-sectional view illustrating a relief valve (closed) according to a third embodiment of the present invention.

FIG. 6 is a cross-sectional view illustrating the relief valve (closed) according to a third embodiment of the present invention.

The third embodiment is configured so that a conventional relief valve uses a ball valve retainer 503 having an increased diameter to let a tubular gap 508 produce a restriction effect and maintain pressure in the intermediate chamber 207. In this instance, the restriction effect may be such that the intermediate chamber maintains a liquid pressure sufficient for lifting the ball valve retainer 503.

According to the third embodiment, the relief pressure loss can be reduced simply by modifying the conventional product slightly. The third embodiment is advantageous in terms of cost because, for example, it saves the bother of designing and manufacturing a new relief valve.

The present invention can be applied not only to a high-pressure fuel supply pump for an internal combustion engine, but also to a wide variety of other high-pressure pumps.

What is claimed is:

1. A high-pressure liquid supply pump for pressurizing a liquid and supplying the pressurized liquid from a low-pressure side to a high-pressure side, the pump comprising:
   a relief path releasing the pressurized liquid from the high-pressure side to the low-pressure side;
   an intermediate chamber provided in said relief path;
   a relief valve assembly equipped with a valve seat positioned toward the high-pressure side of said intermediate chamber, a valve element being attachable to and detachable from said valve seat, and a valve element retainer for pressing said valve element against said valve seat, said valve element retainer having a pressure reception surface for receiving a pressure from said intermediate chamber; and
   a restriction element provided in said relief path so that an inflow path to said intermediate chamber and an outflow path from said intermediate chamber both produce a restriction effect;
   wherein the restriction effect of a first restriction portion formed by the valve seat and the valve element is nearly equal to the restriction effect of a second restriction formed around the valve element retainer;
   wherein the second restriction portion is disposed across the intermediate chamber from the first restriction portion; and
   wherein the liquid pressure in said intermediate chamber is lower than the liquid pressure on the high-pressure side and higher than the liquid pressure on the low-pressure side.

2. The high-pressure liquid supply pump according to claim 1, wherein a first pressure reception area detaching said valve element from said valve seat upon receipt of liquid pressure of the pressurized liquid from a high-pressure section in said relief valve assembly closing is smaller than a second pressure reception area lifting said valve element and said valve element retainer upon receipt of liquid pressure from said intermediate chamber.

3. The high-pressure liquid supply pump according to claim 1, wherein said relief valve assembly includes an adjuster for adjusting the maximum lift amount of said valve element.

4. The high-pressure liquid supply pump according to claim 3, wherein said relief valve assembly has a spring member between said adjuster and said valve element retainer, and said adjuster adjusts a force of pressing said valve element against said valve seat.

5. The high-pressure liquid supply pump according to claim 1, wherein an outflow path from said intermediate chamber has a larger cross-sectional area than an inflow path to said intermediate chamber in the lift amount of the valve element being maximized.

6. The high-pressure liquid supply pump according to claim 1, wherein the outflow path from said intermediate chamber has a smaller cross-sectional area than the inflow path to said intermediate chamber.

7. The high-pressure liquid supply pump according to claim 1, wherein a lateral surface of said valve element retainer is slidably supported and provided with the outflow path from said intermediate chamber.

8. The high-pressure liquid supply pump according to claim 1, wherein the outflow path from said intermediate chamber is a hole formed in said valve element retainer.

9. The high-pressure liquid supply pump according to claim 1, wherein the outflow path from said intermediate chamber is a hole made in a wall surface forming said intermediate chamber.

10. The high-pressure liquid supply pump according to claim 1, wherein said valve element and said valve element retainer are integrated into a single part.

11. The high-pressure liquid supply pump according to claim 1, wherein the liquid is a fuel.

* * * * *